United States Patent [19]

Shibano

[11] Patent Number: 5,352,363
[45] Date of Patent: Oct. 4, 1994

[54] PROCESS FOR REMOVAL OF OIL IN AQUEOUS LIQUID

[76] Inventor: Yoshihide Shibano, 1629-1-12, Oyama-cho, Machida, Tokyo, Japan

[21] Appl. No.: 7,092

[22] Filed: Jan. 21, 1993

[30] Foreign Application Priority Data

Jan. 20, 1992 [JP] Japan .................................. 4-28851

[51] Int. Cl.$^5$ ............................................. B01D 61/16
[52] U.S. Cl. .................................... 210/651; 210/259; 210/804
[58] Field of Search ................. 210/651, 187, 259, 804

[56] References Cited

U.S. PATENT DOCUMENTS

| | | | |
|---|---|---|---|
| 3,565,252 | 2/1971 | Sheehy et al. | 210/259 X |
| 4,071,445 | 1/1978 | Katayama et al. | 210/259 X |
| 4,111,812 | 9/1978 | Baddour | 210/259 X |
| 4,707,269 | 11/1987 | Ohue et al. | 210/804 X |

Primary Examiner—Frank Spear
Attorney, Agent, or Firm—Paul A. Guss

[57] ABSTRACT

Disclosed herein is a process for the removal of an oil in an aqueous liquid wherein after cleaning a workpiece having oil thereon with an aqueous solution of a detergent, the oil contained in the aqueous solution is removed from the aqueous solution. The oil-containing aqueous solution is heated to a predetermined temperature, at which the detergent component does not evaporate, to unite droplets of the oil with each other, thereby making the size of the oil droplets greater, and the oil droplets which have grown greater in size are then separated and removed from the aqueous solution. According to this process, an oil emulsified in the aqueous detergent solution can be separated and removed from the aqueous solution with ease to keep the detergency of the detergent over a long period of time.

13 Claims, 2 Drawing Sheets

PROCESS FOR REMOVAL OF OIL IN AQUEOUS LIQUID

BACKGROUND OF THE INVENTION

1. Field of the Invention

The present invention relates to a process for the removal of an oil contained in an aqueous solution of a detergent from the aqueous detergent solution.

2. Description of the Related Art

Foreign matter such as scraps of raw materials adheres on the surfaces of molded or formed products such as machine parts together with an oil. Therefore, such a product has heretofore been immersed into an organic solvent contained in a cleaning tank to dissolve the oil in the organic solvent, thereby cleaning up the foreign matter. Further, the thus-cleaned product has been rinsed with an additional organic solvent and then dried to provide an end product. A chlorofluorocarbon-type solvent has been commonly used as the organic solvent. In recent years, however, the disruption of the ozonosphere around the earth due to chlorofluorocarbon-type solvents has been pointed out. Accordingly, there is a tendency to prohibit the use of such chlorofluorocarbon-type solvents. As a cleaning process substitutable for the process making use of the chlorofluorocarbon-type solvent, there has therefore been investigated a process making use of water as a cleaning fluid.

An example of a cleaning process for cleaning a molded or formed product making use of water as the cleaning fluid includes an ultrasonic cleaning method. According to this method, the molded or formed product is immersed in washing water contained in a cleaning tank equipped with an ultrasonic oscillator on its bottom. An ultrasonic wave is then applied to the washing water through the ultrasonic oscillator to generate cavitation in the washing water, whereby the oil adhered to the surface of the molded or formed product is removed by a shock wave produced at the time the cavitation is broken down.

In the ultrasonic cleaning method, an aqueous solution of a detergent such as a surface active agent is often used as the washing water in order to better enhance the cleaning effect. In the ultrasonic cleaning method, however, the oil adhered to the molded or formed product is cut up into minute droplets having a droplet size of about several microns to several tens of microns when removed from the molded or formed product. The oil is hence easily emulsified by the detergent. The oil emulsified as described above involves a problem that it becomes hard to float on the surface of the aqueous solution, and is difficult to remove from the aqueous solution. Therefore, the amount of oil emulsified in the aqueous detergent solution increases as the aqueous detergent solution is used repeatedly, leading to loss of the detergency of the detergent in a short period of time. Since most of the cost of the ultrasonic cleaning method due to use of the detergent, it is desired that the detergency of the detergent be kept over a long period of time as much as possible.

In order to keep the detergency of the detergent over a long period of time, it has therefore been attempted to remove the oil floating on the surface of the aqueous detergent solution by an oil skimmer. However, only a part of the oil, which is relatively great in droplet diameter and easy to float, can be removed by the oil skimmer because most of the oil contained in the aqueous solution does not float as described above. Accordingly, the method making use of the oil skimmer can not be said to be sufficient for removal of the oil in the aqueous solution.

It has also been attempted to remove the oil in the aqueous solution by means of an oil-separating membrane for separating the aqueous detergent solution and the oil from each other. However, since the oil-separating membrane serves to cause small molecules such as water and the detergent component to selectively pass therethrough, thereby separating the aqueous detergent solution and the oil from each other, the separation of the oil which is cut up into the minute droplets as described above by filtration requires use of an oil-separating membrane with high precision. However, such an oil-separating membrane with high precision involves the following disadvantages. Namely, it tends to be clogged with the oil, though the degree of clogging varies according to the amount of oil to be filtered out. A further washing step for removing such clogging from the membrane takes a long time, and must also use a detergent, resulting in increase in the cost of the ultrasonic cleaning.

SUMMARY OF THE INVENTION

It is accordingly an object of the present invention to provide a process for the removal of an oil in an aqueous liquid, by which an oil emulsified in an aqueous solution of a detergent can be separated and removed from the aqueous solution with ease to keep the detergency of the detergent over a long period of time.

In order to achieve the above object, in a first embodiment of the present invention, there is thus provided a process for the removal of an oil in an aqueous liquid wherein after cleaning a workpiece having oil thereon with an aqueous solution of a detergent, the oil contained in the aqueous solution is removed from the aqueous solution. The process comprises the steps of heating the oil-containing aqueous solution to a predetermined temperature, at which the detergent component does not evaporate, to unite droplets of the oil with each other, thereby making the size of the oil droplets greater, and separating and removing the oil droplets which have grown greater in size from the aqueous solution.

Molecules of the detergent surround minute droplets of the oil to form micelles, whereby most of the oil existing in the aqueous solution is emulsified in the aqueous solution. According to such a process, however, when the aqueous solution is heated to the temperature at which the detergent component does not evaporate, the capability of the detergent to emulsify the oil is reduced, so that the micelles of the detergent become unstable. Therefore, the minute droplets of the oil, which have been contained in the micelles, unite with each other to grow into droplets having a greater diameter, while still maintaining their emulsified state.

The oil droplets which have grown greater in size are then separated from the aqueous solution, whereby the oil can be removed from the aqueous solution with ease. It is therefore possible to keep the detergency of the detergent over a long period of time.

The oil-removing process according to the first aspect of the present invention can be particularly advantageously applied in the case where washing of the workpiece is conducted by immersing the workpiece in the aqueous detergent solution, and applying an ultrasonic wave to the aqueous solution. When the ultrasonic wave is applied to the aqueous detergent solution upon cleaning the oil-containing workpiece with the aqueous detergent solution, most of the oil removed from the workpiece is emulsified as minute droplets having a droplet diameter of about several microns to several tens of microns in the detergent. Therefore, the oil cannot easily float on the surface of the aqueous solution. According to the above process, however, even the abovedescribed minute droplets of the oil can be caused to grow greater in diameter, whereby they can be removed with ease.

If the detergent component contained in the aqueous solution evaporates, the detergency of the detergent is reduced. Therefore, the heating of the aqueous solution may preferably be conducted at a temperature within a range of 40°-60° C. in order to lower the capability of the detergent to emulsify the oil, without evaporating the detergent component contained in the aqueous solution, to make the diameter of the oil droplets greater.

If the heating temperature is lower than 40° C., the capability of the detergent to emulsify the oil may not be sufficiently reduced in some cases. On the other hand, any temperatures higher than 60° C. may make the use of the oil-separating membrane unsuitable in some cases.

The oil droplets which have grown greater in size can be easily separated from the aqueous solution by, for example, an oil-separating membrane. The oil-separating membrane operates by causing droplets in an aqueous solution to selectively pass through the membrane according to their size. Water molecules, surfactant molecules of the detergent component and the like, which are small in size, are allowed to pass through the membrane, but the oil which has been made greater in droplet size as described above is not allowed to pass through the membrane, and hence is filtered out of the solution.

As the oil-separating membrane, there may be used an ultrafilter membrane, a Teflon membrane or the like which are conventional oil-separating membranes. However, it is preferable to use the Teflon membrane because oil separated by filtration does not easily adhere thereto, and hence washing of the membrane can be conducted with ease. The oil-separating membrane may preferably be in the form of a hollow filament. The membrane in the form of a hollow filament is generally used as a separation-membrane module in which a plurality of such membranes in the form of hollow filaments are charged into a housing.

According to the first embodiment of the present invention, since the oil droplets are caused to grow greater in size, they can be easily separated even when using an oil-separating membrane which is not very high in separation precision, and the use of such an oil-separating membrane makes the maintenance of the apparatus easy.

Most of the oil is in a state wherein it is difficult for the oil to float on the surface of the aqueous solution, but a portion thereof does float on the surface of the aqueous solution. In the process according to the first embodiment, it is therefore preferable to provide a step of removing any floating oil. The oil floating on the surface of the aqueous solution is thereby separated and removed from the aqueous solution prior to the step of removing the oil droplets which have grown greater in size. In the process according to the first embodiment, the oil floating on the surface of the aqueous solution is removed in advance, as described above, whereby the load on the oil-separating membrane can be reduced.

In the case where the floating oil is removed in advance, the oil floating on the surface of the aqueous solution may preferably be removed by a floating oil-removing means such as an oil skimmer.

In a second embodiment of the present invention, there is also provided a process for the removal of an oil in an aqueous liquid, which comprises the steps of feeding an aqueous solution of a detergent, within which a workpiece having oil thereon has been cleaned, and which contains the oil therein, into a first sealed vessel. Then the aqueous solution is fed into a second sealed vessel, airtightly connected to the first sealed vessel and further into an oil-removing tank from the second sealed vessel. The aqueous solution is heated by a heating means provided in the first sealed vessel to a temperature at which at least part of the detergent component contained in the aqueous solution is vaporized, thereby uniting droplets of the oil with each other so as to cause the oil to float on the surface of the aqueous solution and separate the oil from the aqueous solution. The component vaporized in the first sealed vessel is then cooled by a cooling means provided in the second sealed vessel to condense the same, thereby returning the vaporized component to the aqueous solution from which the oil has been separated, and an oil floating on the surface of the aqueous solution which has been fed to the oil-removing tank and from which the oil has been separated is removed by a floating oil removing means.

According to such a process, the aqueous solution is first of all heated in the first sealed vessel to a temperature at which at least part of the detergent component contained in the aqueous solution is vaporized, whereby the concentration of the detergent component in the aqueous solution is lowered. Therefore, it becomes difficult for the detergent component to maintain micelles surrounding the oil which exists in the aqueous solution, so that the emulsified state brought about by the detergent is broken. As a result, minute droplets of oil unite with each other to grow into droplets having a greater diameter. The oil droplets which have grown greater in size float on the surface of the aqueous solution, so that the aqueous solution separates into two phases comprising an aqueous phase and an oil phase.

The aqueous solution from which the oil has been separated is then fed from the first sealed vessel to the second sealed vessel. At this time, the component vaporized in the first sealed vessel is fed to the second sealed vessel together with the aqueous solution, and cooled in the second sealed vessel, whereby it is condensed so as to return to the aqueous solution from which the oil has been separated. Since both heating treatment and cooling treatment are conducted in the respective sealed vessels, and the second sealed vessel is airtightly connected to the first sealed vessel, the vaporized component does not escape out, so that the detergency of the aqueous detergent solution is kept as it was.

The aqueous solution from which the oil has been separated is then fed from the second sealed vessel to the oil-removing tank to separate and remove the oil floating on the surface of the aqueous solution. In the aqueous solution contained in the oil-removing tank, as described above, the emulsified state of the oil, which has been brought about by the detergent, is completely broken, and the aqueous solution is separated into two phases comprising an oil phase and an aqueous phase. Therefore, the floating oil can be removed with ease, and the detergency of the detergent can hence be kept over a long period of time.

The oil-removing process according to the second embodiment of the present invention can be particularly advantageously applied in the case where washing of a workpiece is conducted by immersing the workpiece in the aqueous detergent solution, and applying an ultrasonic wave to the aqueous solution. When the ultrasonic wave is applied to the aqueous detergent solution upon cleaning the oil-containing workpiece with the aqueous detergent solution, most of the oil removed from the workpiece is emulsified as minute droplets having a droplet diameter of about several microns to several tens of microns in the detergent. Therefore, the oil does not easily float on the surface of the aqueous solution. According to the above process, however, the emulsified state of the oil brought about by the detergent is completely broken, and hence the oil droplets having a greater diameter float on the surface of the aqueous solution, so that they can be removed with ease.

The heating of the aqueous detergent solution may preferably be conducted at a temperature within a range of 60°–80° C. Any heating at a temperature lower than 60° C. fails to vaporize the detergent component. On the other hand, any heating at a temperature higher than 80° C. may decompose or adversely modify the detergent component.

The cooling of the component vaporized in the first sealed vessel may preferably be conducted at a temperature within a range of 15°–40° C., further preferably 30°–40° C. Any cooling at a temperature higher than 40° C. has an insufficient effect to condense the vaporized component. On the other hand, any cooling at a temperature lower than 15° C. may require reheating for obtaining a sufficient cleaning effect upon reuse of the aqueous solution, from which the oil has been removed, in cleaning.

In the process according to the second embodiment for the removal of oil, it may be preferable that the oil-removing tank should comprise a first tank to which the aqueous solution from which the oil has been separated in the first and second sealed vessels is fed, a second tank communicating with the first tank at their bottom parts and a third tank which receives the aqueous solution overflowing the second tank. The aqueous solution from which the oil has been separated is fed into the first tank, and the aqueous solution fed to the first tank is fed through the bottom of the first tank into a second tank. Then, the aqueous solution fed to the second tank is caused to overflow the second tank to feed it into a third tank, and the oil floating on the surface of the aqueous solution in the first tank is removed by the floating oil removing means. In this manner, the floating oil can be easily removed in the first tank, and can be prevented from mixing into the aqueous solution to be fed to the third tank. It may also be preferable that the floating oil be removed by an oil skimmer.

These and other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

A process for removing an oil in an aqueous liquid according to the first embodiment of the present invention will hereinafter be described by reference to FIG. 1 which is a schematic representation illustrating an exemplary construction of an oil-removing apparatus suitable for use in performing the oil-removing process according to this embodiment.

The oil-removing process according to this embodiment comprises the steps of heating an aqueous solution of a detergent after cleaning a workpiece having oil thereon, such that the oil is introduced into the solution from the workpiece. The solution is heated to a temperature, at which the detergent component therein does not evaporate, to unite droplets of the oil with each other, thereby making the size of the oil droplets greater, and separating and removing the oil droplets which have grown greater in size from the aqueous solution.

Figure 1:
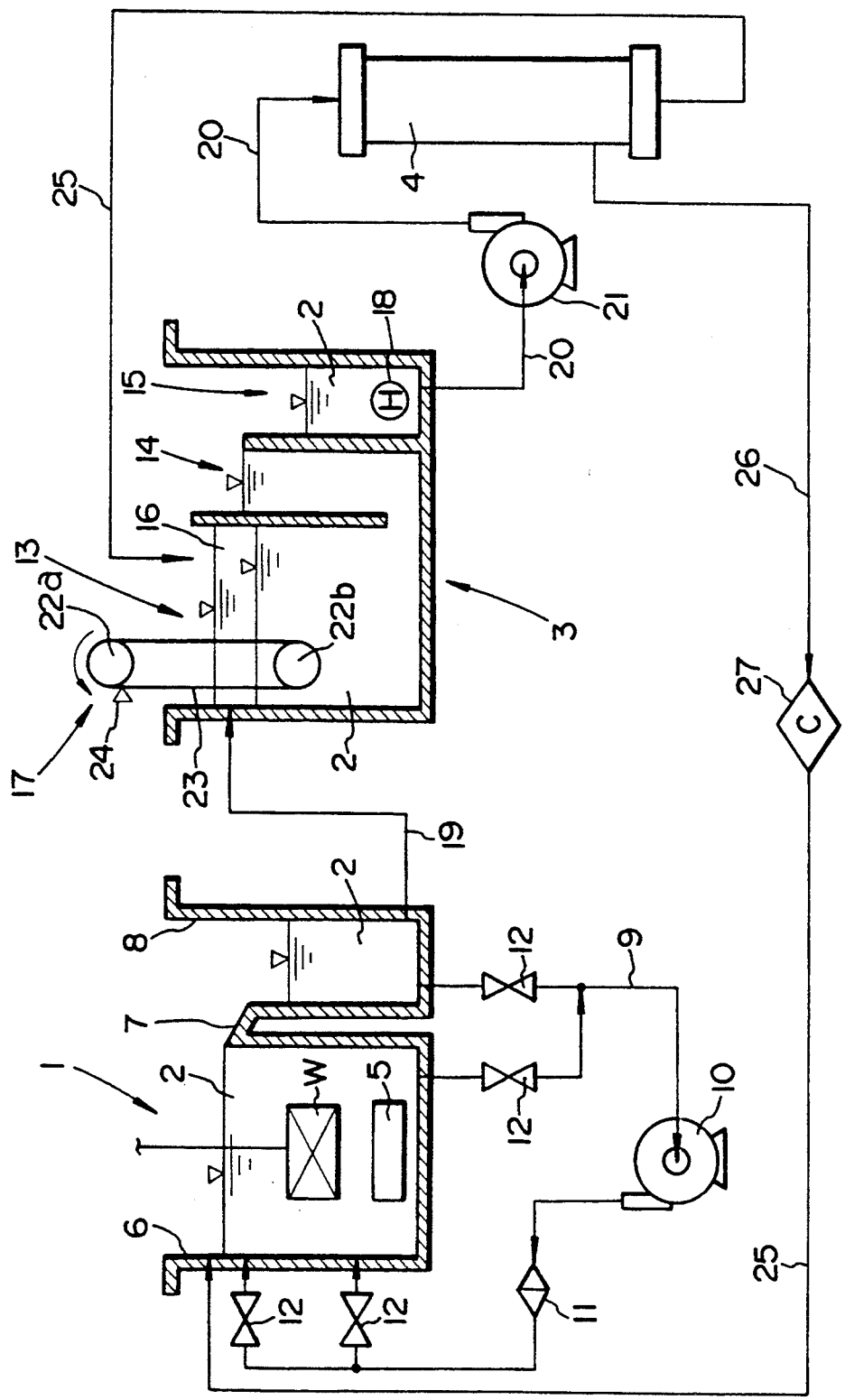
FIG. 1 is a schematic representation illustrating an exemplary construction of an oil-removing apparatus suitable for use in performing an oil-removing process according to an embodiment of the present invention.

In order to perform the above-described process, the oil-removing apparatus shown in FIG. 1 will be used in this embodiment. As illustrated in FIG. 1, the oil-removing apparatus used in this embodiment includes a heating tank 3 adapted to contain therein an aqueous solution 2 of a detergent, which has been taken out of an ultrasonic cleaner 1, and heat the aqueous solution 2 to a temperature, at which the detergent component in the aqueous solution 2 does not evaporate, to unite droplets of the oil existing in the aqueous solution 2 with each other, thereby making the size of the oil droplets greater. An oil-separating membrane module 4 is adapted to separate and remove the oil droplets which have grown greater in size from the aqueous solution 2 taken out of the heating tank 3 and which contains the oil droplets which have grown greater in size.

The ultrasonic cleaner 1 includes an ultrasonic cleaning tank 6 equipped with an ultrasonic oscillator 5 on its bottom and an overflow tank 8 provided contiguously to the ultrasonic cleaning tank 6 and connected to the ultrasonic cleaning tank 6 through an inclined drain 7. A workpiece W, such as a molded or formed product, is immersed in the aqueous detergent solution 2 contained in the ultrasonic cleaning tank 6, and an ultrasonic wave is applied to the aqueous solution 2 through the ultrasonic oscillator 5, thereby removing oil and the like which adheres on the surface of the workpiece W. Below the bottoms of the ultrasonic cleaning tank 6 and the overflow tank 8, there is provided a circulating conduit 9 for taking out the aqueous solution 2 and returning it to the ultrasonic cleaning tank 6 through side wall portions thereof. A circulating pump 10 for circulating the aqueous solution 2 and a filter 11 for filtering minute foreign matter contained in the aqueous solution 2 are provided in the course of the circulating conduit 9. The circulating conduit 9 is also suitably provided with flow control valves 12 for controlling the flow rate of the aqueous solution 2.

Further, a dissolved gas control means for controlling the amount of dissolved gases in the aqueous solution 2 may be provided in the course of the circulating conduit 9. Examples of the dissolved gas control means include deaerating means for removing dissolved gases and pressure-aerating means for exposing the aqueous solution 2 to a gas such as oxygen under pressure to increase the amount of the dissolved gas.

The heating tank 3 includes a first tank 13 to which the aqueous solution 2 is to be fed, a second tank 14 communicating with the first tank 13 at their bottom parts and a third tank 15 which receives the aqueous solution 2 overflowing the second tank 14 and is connected to the oil-separating membrane module 4. The first tank 13 is provided with an oil skimmer 17 for removing floating oil which has been separated from the aqueous solution 2 to form an oil phase 16 on the surface of the aqueous solution 2. The third tank 15 is equipped with a heater 18. The first tank 13 is connected to the overflow tank 8 through a conduit 19, and the third tank is connected to the oil-separating membrane module 4 through a conduit 20. In the course of the conduit 20, a feed pump 21 is provided for taking the aqueous solution 2 out of the third tank 15 and feeding it into the oil-separating membrane module 4.

The oil skimmer 17 comprises a pair of pulleys 22a, 22b, which are provided above the first tank 13 and in the aqueous solution 2 contained in the first tank 13, respectively, and a belt 23 extended between the pulleys 22a, 22b and driven by a drive unit (not shown). A knife 24 is provide in contact under pressure with the belt 23 in the vicinity of the pulley 22a provided above the first tank 13 so as to oppose to the driving direction of the belt 23, whereby the oil adsorbed on the belt 23 is squeezed out of the belt 23 by the knife 24 and guided along the knife 24 to a container (not shown).

The oil-separating membrane module 4 has such a construction that a plurality of Teflon-made ultrafilter membranes in the form of hollow filaments are charged in a housing, and the aqueous solution 2 fed by the feed pump 21 is caused to flow through the interiors of the ultrafilter membranes. The module 4 is provided with an oil-return conduit 25 for taking out the aqueous solution 2 which is still rich in oil and returning it to the first tank 13 at its distal end. The module is further provided with an aqueous solution-return conduit 26 for taking out the aqueous solution 2 from which the oil has substantially been removed and returning it to the ultrasonic cleaning tank 6 at its outer peripheral surface. Further, a cooler 27 for cooling the aqueous solution 2 is provided in the course of the aqueous solution-return conduit 26.

The oil-removing process according to the first embodiment will hereinafter be described in more detail.

The aqueous detergent solution containing the oil therein is to be treated by the oil-removing process according to this embodiment. A workpiece W such as a molded or formed product is immersed in the aqueous detergent solution 2 contained in the ultrasonic cleaning tank 6, and an ultrasonic wave is applied to the aqueous solution 2 through the ultrasonic oscillator 5, thereby cleaning the workpiece W.

The aqueous solution 2 is heated to about 30°-40° C. and then contained in the ultrasonic cleaning tank 6. When the ultrasonic wave is applied to such an aqueous solution 2 through the ultrasonic oscillator 5, cavitation is efficiently generated in the aqueous solution 2, whereby oil adhered to the surface of the workpiece W is removed by a shock wave produced at the time the cavitation is broken down. The oil is thus removed from the workpiece W and becomes dispersed in the aqueous solution 2.

At this time, most of the oil is cut up into minute droplets having a droplet diameter of several microns to several tens of microns and is contained in micelles formed by the detergent contained in the aqueous solution 2, and is hence emulsified in the aqueous solution 2 in a state in which it becomes difficult for the oil to float on the surface of the aqueous solution. However, a portion thereof is dispersed in the aqueous solution 2 without being contained in the micelles. The aqueous solution 2 containing the oil in this condition overflows the ultrasonic cleaning tank 6 into the overflow tank 8 through the drain 7 when another workpiece W is immersed in the aqueous solution 2 in the ultrasonic cleaning tank 6, and is then fed from the overflow tank 8 to the first tank 13 of the heating tank 3 through the conduit 19.

Incidentally, the aqueous solutions 2 contained in the ultrasonic cleaning tank 6 and the overflow tank 8 are separately taken out through the bottoms of the ultrasonic cleaning tank 6 and the overflow tank 8 by the circulating pump 10 via the conduit 9 to return them to the ultrasonic cleaning tank 6 through the side wall portions thereof. The above-described circulation of the aqueous solutions 2 allows the aqueous solution 2 contained in the ultrasonic cleaning tank 6 to be kept at a constant level. Further, the agitation of the aqueous solution 2 contained in the ultrasonic cleaning tank 6 allows the concentration of the detergent in the aqueous solution 2 to be kept constant.

The aqueous solution 2 is fed to the first tank 13 of the heating tank 3 and remains in the first tank 13 for about 15-30 minutes, during which time a portion of the oil contained in the aqueous solution 2 is in the above-described condition. This portion is relatively greater in droplet size and hence easily floats on the surface of the aqueous solution 2 to form an oil phase 16. Since the floating oil forming the oil phase 16 is already separated from the aqueous solution 2, it can be easily removed by the oil skimmer 17.

The oil skimmer 17 is adapted to cause the floating oil to be adsorbed on the belt 23 by causing the belt 23 to pass through the oil phase 16 by the drive unit (not shown), thereby conveying out the oil from above the first tank 13. The oil adsorbed on the belt 23 is then squeezed out of the belt 23 by the knife 24 and guided along the knife 24 to the container (not shown), thereby removing the floating oil.

The oil removed in the first tank 13 by the belt 23 makes up only a very little portion of the oil contained in the aqueous solution 2. Most of the oil is still emulsified as minute droplets in the aqueous solution 2. Therefore, the aqueous solution 2 containing the emulsified oil portion is fed through the bottom of the first tank 13 into the second tank 14 and is then caused to overflow the second tank 14 into the third tank 15. In this manner, the oil forming the oil phase 16 on the surface of the aqueous solution 2 in the first tank 13 can be prevented from entering the third tank 15, whereby the aqueous solution 2 containing only the emulsified oil portion therein is received in the third tank 15.

The aqueous solution 2 is then heated to about 50° C. by the heater 18 provided in the third tank 15. Owing to the heating of the aqueous solution 2, the capability of the detergent to emulsify the oil is reduced, and the micelles of the detergent become unstable. Therefore, the minute oil droplets in the micelles unite with each other to grow into droplets having a greater diameter while maintaining their emulsified state.

The heating is required to be conducted at a temperature at which the components contained in the aqueous solution 2, in particular the detergent component therein, is not evaporated. The heating temperature is generally preset in a range of 40°–60° C. If the heating temperature is higher than 60° C., the evaporated detergent component escapes out because the third tank 15 is open at its top and is hence not sealed, resulting in reduction of the detergency of the detergent. On the other hand, if the heating temperature is lower than 40° C., the emulsifying capability of the detergent is not reduced to such an extent that the droplets of oil are made greater in size.

The aqueous solution 2 containing the oil droplets which have grown greater in size therein is then fed to the oil-separating membrane module 4 through the conduit 20 by the pump 21. In the oil-separating membrane module 4, water molecules, surfactant molecules of the detergent component and the like, which are small in droplet size, are caused to selectively pass through, but the oil which has been made greater in droplet size as described above cannot pass through the oil separating membrane module 4, and hence is filtered out. Therefore, the oil can by removed with ease. As a result, the aqueous solution 2 is separated into an aqueous solution 2 rich in oil content and an aqueous solution 2 from which the oil has been substantially removed.

According to this embodiment, the oil droplets are made greater in size as described above. Therefore, if the Teflon-made ultrafilter membranes in the form of hollow filaments, which have been charged in the oil-separating membrane module 4, are lower in separation precision than conventional oil-separating membranes, the aqueous solution 2 containing the oil therein can be satisfactorily separated into an oil-free aqueous detergent solution and the oil removed therefrom. Since each of the ultrafilter membranes in the form of a hollow filament is made of Teflon, the oil separated by filtration doesn't easily adhere thereto and hence clogging the membrane is avoided. If clogging occurs, its function of the membrane can be easily be restored by washing the oil out of the membrane.

The aqueous solution 2 which is rich in the oil is taken out through the oil-return conduit 25 connected to the distal end of the oil-separating membrane module 4 and returned to the first tank 13 of the heating tank 3. Since the oil taken out through the oil-return conduit 25 has been separated from the detergent component and its emulsified state has hence been broken, it floats on the surface of the aqueous solution 2 contained in the first tank 13 to unite with the oil phase 16, and hence is removed by the oil skimmer 17. Further, any oil portion whose emulsified state is still kept is repeatedly subjected to a process in which it is heated in the third tank 15 and then introduced in the oil-separating membrane module 4.

On the other hand, the aqueous solution 2 from which the oil has been substantially removed is taken out through the aqueous solution-return conduit 26 connected to the outer peripheral surface of the oil-separating membrane module 4 and returned to the ultrasonic cleaning tank 6 for its reuse. At this time, the aqueous solution 2 is cooled to about room temperature by the cooler 27 and then returned to the ultrasonic cleaning tank 6 because a sufficient cleaning effect may not be brought about if the aqueous solution remains heated to a higher temperature.

A process for removing an oil in an aqueous liquid according to the second embodiment of the present invention will hereinafter be described by reference to FIG. 2 which is a schematic representation illustrating an exemplary construction of an oil-removing apparatus suitable for use in performing the oil-removing process according to this embodiment.

According to the oil-removing process of this embodiment, an aqueous solution of a detergent, in which a workpiece having oil thereon has been cleaned and which contains the oil cleaned from the workpiece therein, is fed into a first sealed vessel and then into a second sealed vessel airtightly connected to the first sealed vessel, and further into an oil-removing tank from the second sealed vessel. The aqueous solution is heated by a heating means provided in the first sealed vessel to a temperature at which at least part of the detergent component contained in the aqueous solution is vaporized, thereby uniting droplets of the oil with each other so as to cause the oil to float on the surface of the aqueous solution to separate the oil from the aqueous solution. The component vaporized in the first sealed vessel is then cooled by a cooling means provided in the second sealed vessel to condense the same, thereby returning the condensed detergent to the aqueous solution from which the oil has been separated. Finally, the oil floating on the surface of the aqueous solution which has been fed to the oil-removing tank and from which the oil has been separated is removed by a floating oil removing means.

Figure 2:
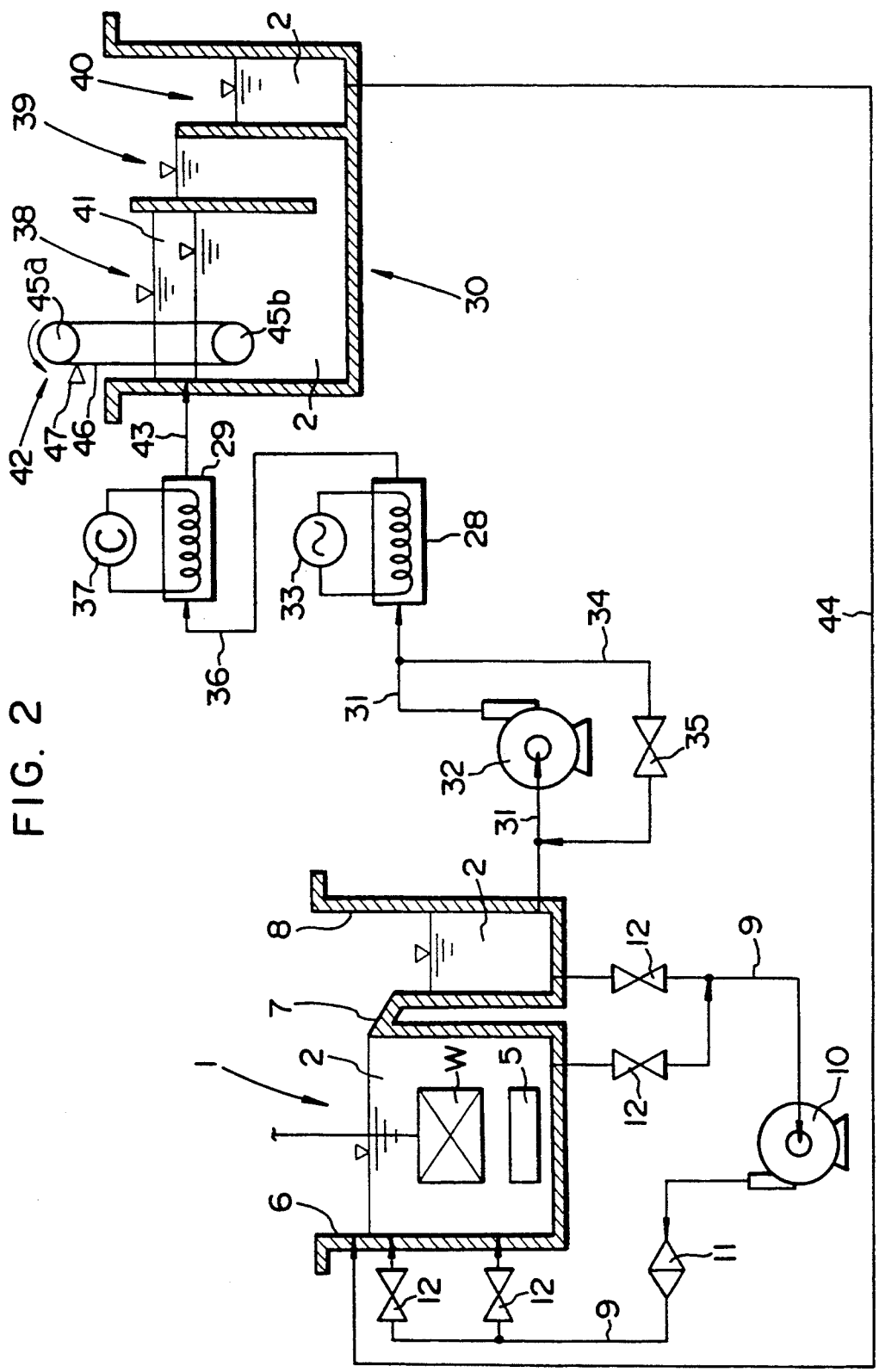
FIG. 2 is a schematic representation illustrating an exemplary construction of another oil-removing apparatus suitable for use in performing an oil-removing process according to another embodiment of the present invention.

In order to perform the above-described process, the oil-removing apparatus shown in FIG. 2 will be used in this embodiment. As illustrated in FIG. 2, the oil-removing apparatus used in this embodiment includes a sealed heating vessel 28 adapted to contain an aqueous detergent solution 2 taken out of an ultrasonic cleaner 1 therein to heat it, thereby vaporizing at least part of the detergent component contained in the aqueous solution 2, and moreover uniting droplets of the oil existing in the aqueous solution 2 with each other so as to separate the oil from the aqueous solution 2 to cause the oil to float on the surface of the aqueous solution 2. A sealed cooling vessel 29 airtightly connected to the heating vessel 28 and is adapted to cool the component vaporized in the heating vessel 28 to condense it. An oil-removing tank 30 is connected to the cooling vessel 29 and is adapted to remove an oil portion floating on the surface of the aqueous solution 2, introduced through the cooling vessel 29, from the aqueous solution 2.

Since an ultrasonic cleaner 1 has the same construction as the ultrasonic cleaner 1 illustrated in FIG. 1, its detailed description is omitted.

The heating vessel 28 is connected to an overflow tank 8 through a conduit 31. In the course of the conduit 31, there is provided a feed pump 32 for taking the aqueous solution 2 out of the overflow tank 8 and feeding it into the heating vessel 28. The heating vessel 28 is equipped with a heater 33 for heating the aqueous solution 2 fed therein to a temperature within a range of 60°–80° C. Incidentally, a bypass conduit 34 is connected to the conduit 31 before and behind the feed pump 32, and a solenoid valve 35 is provided in the course of the bypass conduit 34.

The cooling vessel 29 is airtightly connected to the heating vessel 28 through a conduit 36 and positioned above the heating vessel 28. Further, the cooling vessel 29 is equipped with a cooler 37 for cooling the component vaporized in the heating vessel 28 to a temperature within a range of 15°–40° C. to condense it.

The oil-removing tank 30 includes a first tank 38 to which the aqueous solution 2 from which the oil has been separated is fed from the cooling vessel 29, a second tank 39 communicating with the first tank 38 at their bottom parts and a third tank 40 which receives the aqueous solution 2 overflowing the second tank 39. The first tank 38 is provided with an oil skimmer 42 for removing floating oil which has been separated from the aqueous solution 2 and forms an oil phase 41. The first tank 38 is connected to the cooling vessel 29 through a conduit 43. The third tank 40 is connected to an aqueous solution-return conduit 44 for returning the aqueous solution 2, from which the floating oil has been removed by the oil skimmer 42, to the ultrasonic cleaning tank 6.

The oil skimmer 42 has the same construction as the oil skimmer 17 illustrated in FIG. 1 and comprises a pair of pulleys 45a, 45b, which are provided above the first tank 38 and in the aqueous solution 2 contained in the first tank 38, respectively, and a belt 46 extended between the pulleys 45a, 45b and driven by a drive unit (not shown). A knife 47 is provided in contact under pressure with the belt 46 in the vicinity of the pulley 45a provided above the first tank 38 so as to oppose to the driving direction of the belt 46.

The oil-removing process according to the second embodiment will hereinafter be described in more detail.

As with the first embodiment, the aqueous detergent solution containing the oil, which is to be treated by the oil-removing process according to this embodiment, is provided when a workpiece W is cleaned in the ultrasonic cleaning tank 6. The aqueous solution 2 containing the oil in the same condition as in the first embodiment is first fed by the feed pump 32 from the overflow tank 8 to the heating vessel 28 through the conduit 31.

Since the heating vessel 28 is sealed, its internal pressure is increased as the aqueous solution 2 is excessively fed by the feed pump 32, resulting in a possible problem of its damage or breakage. Therefore, the bypass conduit 34 is connected to the conduit 31 before and behind the feed pump 32, whereby if the internal pressure of the heating vessel 28 becomes higher than a predetermined reference pressure, the solenoid valve 35 is opened to return any excess amount of the aqueous solution 2 on the upstream side of the feed pump 32.

The oil-containing aqueous solution 2 fed to the heating vessel 28 is then heated to about 70° C. by the heater 33. As with the aqueous solution in the first embodiment, most of the oil existing in the aqueous solution 2 is contained in micelles formed by the detergent contained in the aqueous solution 2 and is hence emulsified in the aqueous solution. However, a portion thereof is dispersed in the aqueous solution 2 in the form of minute droplets without being contained in the micelles. When the aqueous solution 2 is heated as described above, a part of the detergent component contained in the aqueous solution 2 is vaporized, whereby the concentration of the detergent is lowered. Therefore, the detergent becomes difficult to keep micelles surrounding the oil which exists in the aqueous solution, so that the emulsified state is broken. As a result, droplets of the oil existing in the aqueous solution 2 unite with each other despite the formation of micelles, whereby the oil is separated from the aqueous solution 2 and floats on the surface of the aqueous solution 2 in the heating vessel 28.

The aqueous solution 2 from which the oil has been separated as described above is then fed to the cooling vessel 29 through the conduit 36. At this time, the detergent component vaporized in the heating vessel 28 is fed to the cooling vessel together with the aqueous solution 2. However, since the cooling vessel 29 is positioned above the heating vessel 28, the vaporized component is prevented from remaining in the conduit 36 and clogging the conduit 36. The component vaporized in the heating vessel 28 is cooled to 30°–40° C. in the cooling vessel 29, whereby it is condensed so as to return to the aqueous solution 2.

Since both heating vessel 28 and cooling vessel 29 are sealed, and the cooling vessel 29 is airtightly connected to the heating vessel 28, the vaporized component does not escape out during either the both heating operation or the cooling operation, so that the detergency of the aqueous detergent solution is kept as it was by condensing the vaporized component in the above-described manner.

The aqueous solution 2 from which the oil has been separated is then fed to the first tank 38 of the oil-removing tank 30. In the aqueous solution 2 contained in the first tank 38, as described above, the emulsified state of the oil has been broken due to the heating in the heating vessel 28, and the droplets of the oil have been made greater in size. Therefore, the oil is already separated from the aqueous solution 2, and hence floats on the surface of the aqueous solution 2 to form an oil phase 41. The floating oil forming the oil phase 41 is removed with ease by the oil skimmer 42.

The removal of the floating oil forming the oil phase 41 is conducted by the oil skimmer 42 in the same manner as in the first embodiment. The oil phase 41 adsorbed on the belt 46 is squeezed out of the belt 46 by the knife 47 and guided to a container (not shown).

The aqueous solution 2 from which the floating oil has been removed as described above is introduced through the bottom of the first tank 38 into the second tank 39 and is then caused to overflow the second tank 39 into the third tank 40. In this manner, the floating oil forming the oil phase 41 on the surface of the aqueous solution 2 in the first tank 38 can be prevented from entering the third tank 40, whereby an aqueous solution 2 from which the oil has been completely removed is provided in the third tank 40.

The aqueous solution 2 contained in the third tank 40 is then returned through the aqueous solution-return conduit 44 to the ultrasonic cleaning tank 6 for its reuse.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the removal of oil from an aqueous solution, the aqueous solution containing a concentration of a detergent therein, comprising the steps of:
   immersing a workpiece having oil thereon into the aqueous solution, and applying an ultrasonic wave to the aqueous solution to clean the workpiece and remove the oil therefrom, wherein the oil removed from the workpiece becomes dispersed in said aqueous solution;

heating the aqueous solution to a predetermined temperature at which the detergent contained in the aqueous solution does not evaporate, to thereby unite droplets of oil dispersed in the aqueous solution with each other and increase the size of the droplets of oil while substantially maintaining the concentration of the detergent in said aqueous solution; and separating and removing the droplets of oil which have increased in size from the aqueous solution.

2. The process as claimed in claim 1, wherein said heating step comprises heating the aqueous solution to a predetermined temperature within a range of 40°–60° C.

3. The process as claimed in claim 1, wherein the oil droplets which have increased in size are removed from the aqueous solution by an oil-separating membrane.

4. The process as claimed in claim 3, wherein said oil-separating membrane comprises an ultrafilter membrane.

5. The process as claimed in claim 3, wherein said oil-separating membrane comprises a hollow filament.

6. The process as claimed in claim 1, further comprising the step of separating and removing oil floating on the surface of the aqueous solution.

7. The process as claimed in claim 6, wherein the floating oil is removed by an oil skimmer.

8. A process for the removal of oil from an aqueous solution, the aqueous solution containing a detergent therein, comprising the steps of:

feeding the aqueous solution containing the detergent into a first sealed vessel, said aqueous solution having droplets of oil dispersed therein;

heating said aqueous solution with a heating means disposed in said first sealed vessel to a predetermined temperature at which at least a portion of the detergent contained in said aqueous solution is vaporized, and further uniting the droplets of oil dispersed in said aqueous solution with each other, thereby increasing the size of said droplets and separating the oil from said aqueous solution;

feeding said aqueous solution and the vaporized portion of the detergent from said first sealed vessel into a second sealed vessel airtightly connected to said first sealed vessel;

cooling the vaporized portion of the detergent with a cooling means disposed in said second sealed vessel, thereby condensing said vaporized portion of the detergent and returning the condensed detergent to said aqueous solution from which the oil has been separated;

feeding said aqueous solution from said second sealed vessel into an oil-removing tank, wherein the oil separated from said aqueous solution is caused to float as a layer of oil on the surface of said aqueous solution in said oil-removing tank; and removing said oil from the surface of said aqueous solution with an oil removing means disposed in said oil-removing tank.

9. The process as claimed in claim 8, further comprising the step of immersing a workpiece having oil thereon into the aqueous solution, and applying an ultrasonic wave to the aqueous solution to clean the workpiece and remove the oil therefrom, wherein the oil removed from the workpiece becomes dispersed in said aqueous solution.

10. The process as claimed in claim 8, wherein the heating step comprises heating the aqueous solution to a predetermined temperature within a range of 60°–80° C.

11. The process as claimed in claim 8, wherein the cooling step comprises cooling the vaporized portion of the detergent to a predetermined temperature within a range of 15°–40° C.

12. The process as claimed in claim 8, wherein the oil removing tank comprises a first tank into which the aqueous solution and the oil which has been separated therefrom is fed, a second tank communicating with the first tank at bottom portions thereof, and a third tank which receives the aqueous solution overflowing from the second tank, the method further comprising the steps of:

feeding the aqueous solution and the oil which has been separated therefrom into the first tank;

feeding the aqueous solution through a bottom portion of the first tank into a bottom portion of the second tank;

causing the aqueous solution to overflow from the second tank into the third tank; and removing the oil floating on the surface of the aqueous solution in the first tank by the floating oil removing means.

13. The process as claimed in claim 8, wherein the oil floating on the surface of the aqueous solution from which the oil has been separated is removed by an oil skimmer.

* * * * *